United States Patent [19]

Santi et al.

[11] Patent Number: 5,721,327

[45] Date of Patent: Feb. 24, 1998

[54] PROCESS FOR THE PREPARATION OF CRYSTALLINE VINYLAROMATIC POLYMERS WITH A PREDOMINANT SYNDIOTACTIC STRUCTURE

[75] Inventors: Roberto Santi, Novara; Giuseppe Cometti, Verbania; Riccardo Po', Livrono; Nicoletta Cardi, Novara, all of Italy

[73] Assignee: Enichem S.p.A., Milan, Italy

[21] Appl. No.: 805,247

[22] Filed: Feb. 24, 1997

[30] Foreign Application Priority Data

Mar. 21, 1996 [IT] Italy ................................ MI96A0553

[51] Int. Cl.$^6$ .................. C08F 4/643; C07F 7/00
[52] U.S. Cl. .................. 526/133; 526/134; 526/153; 526/160; 526/170; 526/346; 526/347.2; 526/943; 556/52; 502/103; 502/132; 502/152; 502/153; 502/154
[58] Field of Search ................. 526/160, 170, 526/134, 133, 943, 153, 347.2; 502/103, 132, 152, 153, 154; 556/52

[56] References Cited

U.S. PATENT DOCUMENTS 5,196,490  3/1993  Campbell, Jr. et al. ............. 526/160
5,596,054  1/1997  Takeuchi ............................ 526/160 X

FOREIGN PATENT DOCUMENTS 8810275  12/1988  WIPO ................................ 526/160

OTHER PUBLICATIONS

Roberts et al, Basic Principles of Organic Chemistry, W.A. Benjamin, Inc., 1965, p. 945.

Primary Examiner—Fred Teskin
Attorney, Agent, or Firm—Oblon, Spivak, McClelland, Maier & Neustadt, P.C.

[57] ABSTRACT

Process for the preparation of crystalline vinylaromatic polymers with a predominant syndiotactic structure which involves polymerizing vinylaromatic monomers in the presence of a catalytic system comprising: a titanium complex having general formula (I):

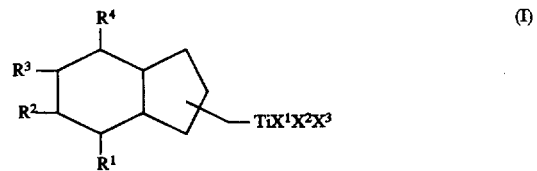

wherein $R^1$, $R^2$, $R^3$ and $R^4$, the same or different, represent a hydrogen atom or a $C_1$–$C_{20}$ alkyl radical or a $C_6$–$C_{20}$ arylalkyl or aryl radical, on the condition that at least one of these is different from hydrogen.

11 Claims, No Drawings

PROCESS FOR THE PREPARATION OF CRYSTALLINE VINYLAROMATIC POLYMERS WITH A PREDOMINANT SYNDIOTACTIC STRUCTURE

The present invention relates to a process for the preparation of vinylaromatic crystalline polymers with a predominant syndiotactic structure.

More specifically, the present invention relates to a process for the preparation of crystalline polystyrene in which the polymeric chains have an essentially syndiotactic configuration.

Polystyrene is a thermoplastic polymer obtained by the radicalic polymerization of styrene and is used in the production of moulded articles, films, electrical materials, materials for packaging, etc. It is an atactic, amorphous polymer with excellent insulating properties and reasonable thermal resistance. For numerous applications it is preferable however to use crystalline materials with a high thermal resistance and resistance to solvents, characteristics which atactic polystyrene does not have.

European patent 210.615 describes a polystyrene having a structure characterized by an extremely high degree of stereoregularity, in which the phenyl substituents are so arranged as to provide a syndiotactic polymer. This material does not have the above disadvantages of atactic polystyrene as it is crystalline and therefore, once transformed, can be subjected to orientation processes, it is almost completely insoluble in organic solvents and has a melting point within the range of 260°–280° C., giving it a high thermal resistance, comparable to or higher than that of condensation thermoplastic polymers (polyesters, polyamides, polyimides, etc.).

Syndiotactic polystyrene can be prepared according to what is described in literature, for example in European patent EP 272.584 or in U.S. Pat. No. 4.978.730, by polymerization catalyzed by compounds of Ti or Zr, in the presence of a cocatalyst represented by methylaluminoxane (a mixture of cyclic and linear oligomers containing the repetitive unit —AlCH₃—) or, as described in published European patent application 421.659, from derivatives of boron containing fluorinated groups.

Examples of catalysts for the synthesis of syndiotactic polystyrene provided in literature are titanium halides (chloride, bromide, etc.), titanium alcoholates (methoxide, ethoxide, propoxide, isopropoxide, butoxide, etc.), titanium carboxylates, metallocenes (cyclopentadienyl titanium trichloride, cyclopentadienyl titanium dichloride, pentamethylcyclopentadienyl titanium trichloride, cyclopentadienyl titanium alkoxides, cyclopentadienyl titanium alkyls, pentamethylcyclopentadienyl titanium alkyls, dicyclopentadienyl titanium dichloride, dicyclopentadienyl titanium alkoxides, etc.), titanium alkyls (titanium tetrabenzyl, titanium tetramethyl, titanium tetraethyl, etc.) and the corresponding zirconium compounds.

The Applicant has now found that it is possible to synthesize crystalline vinylaromatic polymers, and in particular crystalline polystyrene, having a predominant syndiotactic configuration using a new catalytic system which has never been described in literature. This system comprises a particularly substituted indenyl derivative of titanium.

Indenyl derivatives of titanium, as catalysts for the synthesis of syndiotactic polystyrene, are known in literature, for example in International patent application WO 95/01378. However, as is shown hereafter, only substituted indenyl derivatives of titanium such as those of the present invention are capable of giving a significant performance.

The present invention therefore relates to a process for the preparation of crystalline vinylaromatic polymers with a predominant syndiotactic structure which comprises polymerizing vinylaromatic monomers, either alone or mixed with at least one other ethylenically unsaturated copolymerizable monomer, in the presence of a catalytic system essentially consisting of:

a) a titanium complex having general formula (I):

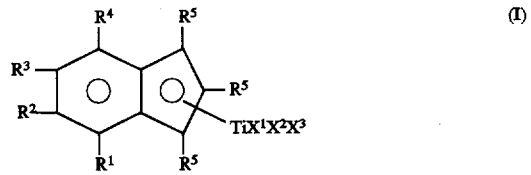

wherein $R^1$, $R^2$, $R^3$ and $R^4$, the same or different, represent a hydrogen atom or a $C_1$–$C_{20}$ alkyl radical or a $C_6$–$C_{20}$ arylalkyl or aryl radical, on the condition that at least one of these is different from hydrogen; $R^5$ represents a hydrogen atom; $X^1$, $X^2$ and $X^3$, the same or different, represent a halogen such as chlorine, or R, OR, NR₂ groups with R as a $C_1$–$C_{20}$ alkyl radical or a $C_6$–$C_{20}$ aryl or arylalkyl radical; and b) a cocatalyst selected from an alkylalumoxane and a compound of boron having formula (II):

$$BY^1Y^2Y^3 \qquad (II)$$

or one of its salts, wherein $Y^1$, $Y^2$ and $Y^3$, the same or different, represent a $C_1$–$C_{20}$ fluorinated hydrocarbon radical.

The compounds having general formula (I) are new products in that they have never been described in scientific literature. They can be obtained with traditional synthesis methods, for example with the methods described in the text of Manfred T. Reetz "Organotitanium Reagents in Organic Synthesis" Springer-Verlag, Berlin (1986), chapter 2 and references quoted therein.

Typical examples of derivatives of titanium having general formula (I) which are particularly suitable for the present invention are:

(4-methylindenyl)titanium trichloride; (4-ethylindenyl) titanium trichloride; (4-methylindenyl)titanium tribromide; (4-ethylindenyl)titanium tribromide; (4-methylindenyl)titanium trimethoxide; (4-ethylindenyl) titanium trimethoxide; (4-methylindenyl)titanium triethoxide; (4-ethylindenyl)titanium triethoxide; (4-methylindenyl)titanium tripropoxide; (4-ethylindenyl) titanium tripropoxide; (4-methylindenyl)titanium triisopropoxide; (4-ethylindenyl)titanium triisopropoxide; (4-methylindenyl)titanium tributoxide; (4-ethylindenyl)titaniumtributoxide; (4-methylindenyl) titanium triphenoxide; (4-ethylindenyl)titanium triphenoxide; (4-methylindenyl)titanium tris (dimethylamide); (4-ethylindenyl)titaniumtris (dimethylamide); (4-methylindenyl)titanium tris (diethylamide); (4-ethylindenyl)titanium tris (diethylamide); (4-methylindenyl)titanium tris (dipropylamide); (4-ethylindenyl)titanium tris (dipropylamide); (4-methylindenyl)titanium tris (diisopropylamide); (4-ethylindenyl)titanium tris (isopropylamide); (4-methylindenyl)titanium trimethyl; (4-ethylindenyl)titanium trimethyl; (4-methylindenyl)titanium triethyl; (4-ethylindenyl)

titanium triethyl; (4-methylindenyl)titanium triisobutyl; (4-ethylindenyl)titanium triisobutyl; (4-methylindenyl)titanium tribenzyl; (4-ethylindenyl) titaniumtribenzyl; (5-methylindenyl)titanium trichloride; (5-ethylindenyl)titanium trichloride; (5-methylindenyl)titanium tribromide; (5-ethylindenyl)titanium tribromide; (5-methylindenyl)titanium trimethoxide; (5-ethylindenyl)titanium trimethoxide; (5-methylindenyl)titanium triethoxide; (5-ethylindenyl)titanium triethoxide; (5-phenylindenyl)titanium trichloride; (5-phenylindenyl)titanium tribromide; (5-phenylindenyl)titanium trimethoxide; (5-phenylindenyl)titaniumtriethoxide; (4,5-dimethylindenyl)titanium trichloride; (4,5-diethylindenyl)titanium trichloride; (4,5-dimethylindenyl)titaniumtribromide; (4,5-diethylindenyl)titaniumtribromide; (4,5-dimethylindenyl)titanium trimethoxide; (4,5-diethylindenyl)titanium trimethoxide; (4,5-dimethylindenyl)titanium triethoxide; (4,5-diethylindenyl)titanium triethoxide; (4,6-dimethylindenyl)titanium trichloride; (4,6-diethylindenyl)titaniumtrichloride; (4,6-dimethylindenyl)titanium tribromide; (4,6-diethylindenyl)titanium tribromide; (4,7-dimethylindenyl)titanium trichloride; (4,7-diethylindenyl)titanium trichloride; (4,7-dimethylindenyl)titanium tribromide; (4,7-diethylindenyl)titanium tribromide; (5,6-dimethylindenyl)titanium trichloride; (5,6-diethylindenyl)titanium trichloride; (5,6-dimethylindenyl)titanium tribromide; (5,6-diethylindenyl)titanium tribromide; (4,5,6-trimethylindenyl)titanium trichloride; (4,5,6-triethylindenyl)titanium trichloride; (4,5,6-trimethylindenyl)titanium tribromide; (4,5,6-triethylindenyl)titanium tribromide; 4,5,6,7-tetramethylindenyl)titanium trichloride; (4,5,6,7-tetraethylindenyl)titanium trichloride; (4,5,6,7-tetramethylindenyl)titanium tribromide; (4,5,6,7-tetraethylindenyl)titanium tribromide; (4,5-diethyl-7-phenyl-indenyl)titanium trichloride; (4-isopropyl-7-dodecylindenyl)titanium diphenoxy chloride; etc.

The molar ratio between vinylaromatic monomer and titanium is not particularly critical but can vary from 1,000 to 500,000, preferably from 5,000 and 200,000.

The alkylalumoxane cocatalyst essentially consists of mixtures of products having a linear or cyclic or caged structure. In the first case the structure is represented by the general formula (III):

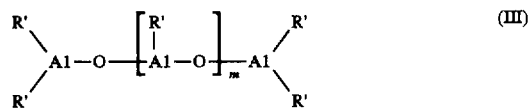

whereas in the second case by the general formula (IV):

wherein m represents an integer between 1 and 40 and R' a $C_1$–$C_{20}$, preferably $C_1$–$C_8$, alkyl radical; a $C_6$–$C_{20}$, preferably $C_6$–$C_{12}$, aryl radical; a $C_7$–$C_{20}$, preferably $C_7$–$C_{12}$, arylalkyl or alkylaryl radical; or a $C_3$–$C_{20}$, preferably $C_5$–$C_8$, cycloalkyl radical; or an O—R' radical, wherein R' represents a $C_1$–$C_8$, preferably $C_3$–$C_{20}$, alkyl radical; a $C_6$–$C_{20}$, preferably $C_6$–$C_{12}$, aryl radical; a halogen atom, such as chlorine, fluorine or bromine, provided not all $R_1$ radicals are contemporaneously O—R' or halogens. The caged structure is described in Macromolecular Symposia, Vol. 97, 1995.

The cocatalysts mentioned above, having general formulae (III) and (IV) are known in literature and described, for example, in published European patent applications 272.584 and 421.659 or in U.S. Pat. No. 4.978.730.

The cocatalyst having general formula (II), or its salt, is known in literature and is described in published European patent applications 421.659 and 482.934.

Preferred cocatalysts having general formulas (II), (III) or (IV) are tris(pentafluorophenyl)boron and methylalumoxane, a mixture of linear oligomers with m average between 10 and 20 and cyclic oligomers with m average between 10 and 20. The cocatalyst is generally used in such quantities that the molar ratio alumino/titanium is between 50 and 2000 or that the ratio boron/titanium is between 0.5 and 5.

According to the process of the present invention, the catalytic system described above can also comprise, optionally, an aluminium alkyl in which the alkyl group contains from 1 to 6 carbon atoms, for example aluminium trimethyl, aluminium triethyl, aluminium triisobutyl, etc. in such quantities that the molar ratio aluminium alkyl/titanium is between 0 and 2,000.

The term "vinylaromatic polymers" as used in the present invention and claims basically refers to polymers of styrene and derivatives of styrene and the relative copolymers containing up to 20% in moles of another copolymerizable monomer selected from those having general formula (V):

$$CH_2=CH—R'' \quad (V)$$

wherein R" represents a hydrogen atom or a $C_1$–$C_6$ alkyl radical or a $C_4$–$C_{12}$ cycloalkyl radical.

Derivatives of styrene comprise alkyl styrenes, in which the alkyl group contains from 1 to 4 carbon atoms, halogenated styrenes, $C_1$–$C_4$ alkoxy styrenes, carboxy styrenes, vinylnaphthalenes such as alpha- or beta-vinyl naphthalene, vinyl tetrahydro naphthalene such as 1,2,3,4-tetrahydro-6-vinylnaphthalene, etc. Typical examples of substituted styrenes are p-methylstyrene, m-methylstyrene, alone or mixed with each other, ethylstyrene, butylstyrene, p-ter-butylstyrene, dimethylstyrene, chlorostyrene, bromostyrene, fluorostyrene, chloromethylstyrene, methoxystyrene, acetoxy methylstyrene, etc.

The polymerization reaction can be carried out in mass or in solvent. In the latter case, the solvent can consist of aliphatic or aromatic hydrocarbons or their mixtures and is used in such quantities that the ratio by volume solvent/monomers is between 0 and 10. The preferred solvent is toluene.

More specifically, according to the general procedure adopted for this type of reaction, the vinylaromatic monomers are subjected before polymerization to specific treatment to eliminate catalytic poisons, such as phenol stabilizers, water, phenylacetylene, and consisting in distillation, passage on columns containing activated molecular sieves or activated alumina, etc. The monomers and, optionally, the solvent are charged into the reaction equipment together with the possible aluminium alkyl and cocatalyst. After a time varying from 5 seconds to 30 minutes a solution of the complex (a) is added. The reaction proceeds for times varying from 15 minutes to 10 hours a temperatures of between 20° and 100° C. At the end, the polymer obtained is recovered using the traditional methods.

The following illustrative but non-limiting examples are provided to give a better understanding of the present invention and for its embodiment.

Analysis procedure:

The percentage of syndiotactic polymer is determined by extracting the polymer with acetone or methylethylketone (MEK) at boiling point for 10–20 hours.

The degree of stereoregularity is determined by nuclear magnetic resonance spectroscopy of carbon 13 as described in U.S. Pat. No. 4,680.353.

The molecular weights of the polymers obtained were determined by Gel Permeation Chromatography in trichlorobenzene at 135° C.

EXAMPLE 1

60 ml of n-butyl lithium, 2.5 M in hexane (0.145 moles) are slowly added to a solution of 21 g of 4,7-dimethylindene (0.145 moles) dissolved in 200 ml of tetrahydrofuran (THF) maintaining the temperature at 20°–25° C. At the end of the addition the stirring is maintained for 3 hours. The temperature is brought to −70° C. and 18.4 ml of trimethylchlorosilane (0.145 moles) dissolved in 75 ml of THF, are added, the temperature being prevented to exceed −65° C. At the end the stirring is continued for a night and the temperature left to rise to room value. The reaction mass is hydrolyzed with water and extracted with methylene chloride. The organic extract is washed with water, anhydrified on sodium sulfate and then evaporated.

Upon distillation of the residue 23 g (73%) of 1-trimethylsilyl-2,5-dimethylindene are obtained.

10 g of 1-trimethylsilyl-2,5-dimethylindene (0,046 moles) dissolved in 10 ml of methylene chloride are added to a solution of 6.2 ml (0.056 moles) of titanium tetrachloride in 120 ml of methylene chloride maintained at −20° C. After a night a green crystalline solid is separated. The solvent is decanted, the residue is washed with cold methylene chloride and dried under vacuum. 11 g (85%) of titanium complex are obtained, which is pure on NMR analysis.

The overall yield with respect to 4,7-dimethylindene was 62%.

EXAMPLE 2

Operating as in example 1, but substituting the 4,7-dimethylindene with 5,6-dimethylindene, (5,6-dimethylindenyl)titanium trichloride was obtained, pure on NMR analysis, with a yield of 64%.

EXAMPLE 3

Operating as in example 1, but substituting the 4,7-dimethylindene with 4,7-diphenylindene, (4,7-diphenylindenyl)titanium trichloride was obtained, pure on NMR analysis, with a yield of 51%.

EXAMPLE 4

20 ml of styrene, purified by passage on a column of basic alumina, and 1.2 ml of a 1.57 M solution in toluene of methylaluminoxane were charged in an inert atmosphere into a tailed test-tube. After 5 minutes 3.03 ml of a 2.06 mM solution in tolene of (4,7-dimethylindenyl)titanium trichloride were added.

The reaction was carried out for 2 hours at 60° C. At the end, the mixture was suspended in 200 ml of methanol, containing 2 ml of concentrated HCl, and filtered. The solid was again suspended in methanol, filtered and dried under vacuum. 5.47 g (yield 30.1%) of polymer were obtained.

Fraction insoluble in methylethylketone (MEK): 82%.

13–C NMR analysis showed that the polymer has a percentage of syndiotactic dyads of 99.4%.

Weight average molecular weight Mw: 162,000.

EXAMPLE 5 (Comparative)

20 ml of styrene, purified by passage on a column of basic alumina, and 1.2 ml of a 1.57 M solution in toluene of methylaluminoxane were charged in an inert atmosphere into a tailed test-tube. After 5 minutes 2.2 ml of a 2.85 mM solution in tolene of (indenyl)titanium trichloride were added.

The reaction was carried out for 2 hours at 60° C. At the end, the mixture was suspended in 200 ml of methanol, containing 2 ml of concentrated $HC_1$, and filtered. The solid was again suspended in methanol, filtered and dried under vacuum. 2.11 g (yield 11.6%) of polymer were obtained.

Fraction insoluble in methylethylketone (MEK): 86%.

13-C NMR analysis showed that the polymer has a percentage of syndiotactic dyads of 99.5%.

Weight average molecular weight Mw: 250,000.

EXAMPLE 6 (Comparative)

20 ml of styrene, purified by passage on a column of basic alumina, and 1.2 ml of a 1.57 M solution in toluene of methylaluminoxane were charged in an inert atmosphere into a tailed test-tube. After 5 minutes 3.1 ml of a 2.00 mM solution in tolene of (2,4,7-trimethylindenyl)titanium trichloride were added.

The reaction was carried out for 2 hours at 60° C. At the end, the mixture was suspended in 200 ml of methanol, containing 2 ml of concentrated HCl, and filtered. The solid was again suspended in methanol, filtered and dried under vacuum. 1.42 g (yield 7.8%) of polymer were obtained.

Fraction insoluble in methylethylketone (MEK): 78%.

13-C NMR analysis showed that the polymer has a percentage of syndiotactic dyads of 99.5%. Weight average molecular weight Mw: 149,000.

EXAMPLE 7 (Comparative)

20 ml of starer, purified by passage on a column of basic alumina, and 1.2 ml of a 1.57 M solution in toluene of methylaluminoxane were charged in an inert atmosphere into a tailed test-tube. After 5 minutes 2.95 ml of a 2.12 mM solution in tolene of (1-trimethylsilylindenyl)titanium trichloride were added.

The reaction was carried out for 2 hours at 60° C. At the end, the mixture was suspended in 200 ml of methanol, containing 2 ml of concentrated HCl, and filtered. The solid was again suspended in methanol, filtered and dried under vacuum. 1.49 g (yield 8.2%) of polymer were obtained.

Fraction insoluble in methylethylketone (MEK): 53%.

13-C NMR analysis showed that the polymer has a percentage of syndiotactic dyads of 98.9%.

Weight average molecular weight Mw: 74,000.

We claim:

1. A process for the preparation of a crystalline vinylaromatic polymer with a predominant syndiotactic structure which comprises polymerizing a vinylaromatic monomer, either alone or mixed with at least one other ethylenically unsaturated copolymerizable monomer, in the presence of a catalytic system consisting essentially of:

a) a titanium complex having formula (I):

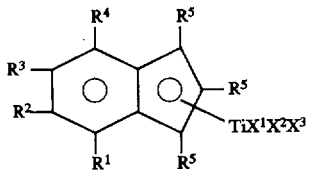

wherein $R^1$, $R^2$, $R^3$ and $R^4$, the same or different, represent a hydrogen atom or a $C_1$–$C_{20}$ alkyl radical or $C_6$–$C_{20}$ arylalkyl or aryl radical, on the condition that at least one of these is different from hydrogen; $R^5$ represents a hydrogen atom; $X^1$, $X^2$ and $X^3$, the same or different, represent a halogen, or R, OR, $NR_2$ groups with R as a $C_1$–$C_{20}$ alkyl radical or a $C_6$–$C_{20}$ aryl or arylalkyl radical; and b) a cocatalyst selected from an alkylalumoxane and a compound of boron having formula (II):

$$BY^1Y^2Y^3 \qquad (II)$$

or one of its salts, wherein $Y^1$, $Y^2$ and $Y^3$, the same or different, represent a $C_1$–$C_{20}$ fluorinated hydrocarbon radical.

2. The process according to claim 1, wherein the molar ratio between vinylaromatic monomer and titanium is between 1,000 and 500,000.

3. The process according to claim 1, wherein the cocatalyst is used is such quantities that the molar ratio aluminium/titanium is between 50 and 2000 or that the ratio boron/titanium is between 0.5 and 5.

4. The process according to claim 1, wherein the catalytic system comprises an aluminum alkyl in which the alkyl group contains from 1 to 6 carbon atoms.

5. The process according to claim 4, wherein the molar ratio aluminium alkyl/titanium is between 0 and 2,000.

6. The process according to claim 1, wherein the polymerization reaction is carried out in mass or in solvent.

7. The process according to claim 6, wherein the solvent is used in such quantities that the ratio by volume solvent/monomers is between 0 and 10.

8. The process according to claim 1 wherein the polymerization is carried out at temperatures of between 20° and 100° C.

9. The process according to claim 1, wherein said $X^1$, $X^2$ and $X^3$ are chlorine.

10. A titanium complex having formula (I):

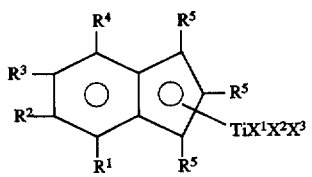

wherein $R^1$, $R^2$, $R^3$ and $R^4$, the same or different, represent a hydrogen atom or a $C_1$–$C_{20}$ alkyl radical or $C_6$–$C_{20}$ arylalkyl or aryl radical, on the condition that at least one of these is different from hydrogen; $R^5$ represents a hydrogen atom; $X^1$, $X^2$ and $X^3$, the same or different, represent a halogen, or R, OR, $NR_2$ groups with R as a $C_1$–$C_{20}$ alkyl radical or a $C_6$–$C_{20}$ aryl or arylalkyl radical.

11. The titanium complex of claim 10, wherein said $X^1$, $X^2$ and $X^3$ are chlorine.

* * * * *